United States Patent [19]

Leiber

[11] Patent Number: 4,840,434
[45] Date of Patent: Jun. 20, 1989

[54] VEHICLE BRAKE SYSTEM HAVING AN ANTI-SKID APPARATUS

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 750,453

[22] Filed: Jul. 1, 1985

[30] Foreign Application Priority Data

Aug. 25, 1984 [DE] Fed. Rep. of Germany ....... 3431326

[51] Int. Cl.4 .............................................. B60T 8/26
[52] U.S. Cl. ................................... 303/113; 303/9.63; 303/9.71; 303/9.75; 303/15; 303/115; 303/119; 303/110
[58] Field of Search ................. 303/92, 6 C, 119, 117, 303/118, 115, 113, 116, 114, 89, 22, 15, 13, 84, 24, 110, 9.62–9.75; 188/353, 349, 265, 181; 137/625.29, 599.1; 251/129.01–129.09, 129.1–129.19, 129.20–129.22

[56] References Cited

U.S. PATENT DOCUMENTS

| 2,181,717 | 11/1939 | Wood et al. ............... 251/129.02 X |
| 2,583,485 | 1/1952 | Harmon et al. ................ 188/353 X |
| 2,708,561 | 5/1955 | Ehlke ............................ 251/129.02 |
| 2,991,797 | 7/1961 | Baldwin ............................ 137/493 |
| 3,674,317 | 7/1972 | Mangold .......................... 303/92 X |
| 3,684,328 | 8/1972 | Koivunen ............................ 303/92 |
| 3,747,990 | 7/1973 | Tanguy ............................... 303/92 |
| 3,782,786 | 1/1974 | Matsumura ......................... 303/115 |
| 3,813,130 | 5/1974 | Inada ............................... 303/92 X |
| 3,922,021 | 11/1975 | Every .............................. 303/92 X |
| 4,229,049 | 10/1980 | Ando ............................... 303/6 C |
| 4,358,163 | 11/1982 | Young ............................. 303/15 X |
| 4,385,786 | 5/1983 | Kubota ........................... 303/9.74 |
| 4,413,861 | 11/1983 | Nagashima ....................... 303/6 C |
| 4,478,461 | 10/1984 | Leiber ............................... 303/92 |
| 4,484,784 | 11/1984 | Leiber ............................... 303/92 |
| 4,500,138 | 2/1985 | Mizusawa et al. ................. 303/6 C |
| 4,557,527 | 12/1985 | Stumpe .......................... 303/119 X |

FOREIGN PATENT DOCUMENTS

| 3222798 | 12/1983 | Fed. Rep. of Germany . |
| 3409290 | 9/1985 | Fed. Rep. of Germany . |
| 0057549 | 5/1981 | Japan ........................... 303/24 F |
| 2122295 | 1/1984 | United Kingdom . |
| 2165601 | 4/1986 | United Kingdom . |

Primary Examiner—Douglas C. Butler
Attorney, Agent, or Firm—Edwin E. Greigg

[57] ABSTRACT

The proposed vehicle brake system includes a brake fluid pressure device embodied as a brake booster, front wheel brakes rear wheel brakes and an anti-skid apparatus having valves for maintaining, reducing and increasing brake pressure. One of the brake pressure maintenance valves is associated with the rear wheel brakes and is further developed into a valve combination, which additionally includes a brake pressure regulating valve. The valve combination includes only one valve seat and one valve element, which serves both for keeping braking pressure constant in the anti-skid situation and to limit the rear wheel braking pressures during braking. The valve element is controlled on one side by a control piston acted upon by brake pressure and on the other by an electromagnet.

5 Claims, 2 Drawing Sheets

VEHICLE BRAKE SYSTEM HAVING AN ANTI-SKID APPARATUS

BACKGROUND OF THE INVENTION

The invention is based on a vehicle brake system as generally defined hereinafter.

In order to attain the shortest possible vehicle stopping distances of a vehicle in its track without undue swerving, it is known to incorporate brake pressure regulating valves in the brake lines leading to the rear wheel brakes (U.S. Pat. No. 2,991,797 and German Offenlegungsschrift 32 22 798). When wheel stresses have been dynamically altered because of braking deceleration, these brake pressure regulating valves avoid excessively severe actuation of the rear wheel brakes. The brake pressure regulating valves are preferably installed in vehicles having a front wheel drive. Depending on the type of brake pressure regulating valve used, the theoretically maximum possible rear wheel braking forces are only partially attained.

Anti-skid brake systems are shown in U.S. Pat. No. 4,478,461 and 4,484,784 which include control for controlling the front and back brakes. Prior art systems have the advantage that with increasingly forceful pedal actuation, they limit braking pressures whenever the maximum possible friction between the wheel and the road surface at a given time has been attained. If a severely braked vehicle moves from a gripping surface to one that has less grip, such as ice, then in such anti-skid brake systems the braking pressures are reduced until such time as the maximum possible friction between wheel and road surface has again been attained. The known brake pressure regulating valves for rear wheel brakes can also be built into anti-skid brake systems, for the sake of their known advantages. However, building in a brake pressure regulating valve of simple embodiment may have the disadvantage, if the rear wheel brake pressure limitation has attained a maximum value and at least one front wheel of the vehicle is tending to skid, that the maximum possible friction between the rear wheels and the road surface cannot be exploited for decelerating the vehicle. In a particular type of anti-skid system, the driver is warned of tendencies toward skidding by means of vibrations at the pedal of the vehicle brake system. With anxious drivers, the result can be that even in an emergency, where the maximum possible braking deceleration is essential, they will not actuate the pedal as severely as the situation warrants. Building in known brake pressure regulating valves has the further disadvantage that it makes the vehicle brake system more expensive, and it increases the number of locations at which leakage losses can occur.

OBJECT AND SUMMARY OF THE INVENTION

The method according to the invention has the advantage that the maximum possible friction between the rear wheels and the road surface at a particular time can be exploited. Further embodying the method in accordance with this teaching has the advantage that even in the event of brake circuit failure, which normally results in a shutoff of the anti-skid apparatus, forceful emergency braking is still attainable. The method having the characteristic as taught herein has the advantage that even if one brake circuit in a multiple-circuit system should fail, forceful braking is still possible.

By means of the provisions revealed advantageous further embodiments of and improvements to the vehicle brake system according to the invention are attainable. This application further recites characteristics by means of which the cost of manufacture of the system and of installing it in a vehicle is lower than when previously known conventional valves separate from one another are used. Additionally, because there are fewer connections, there is greater protection against leakage losses. The concept according to the invention, that is, to unite a brake pressure regulating valve with a brake pressure maintenance valve, can also be realized without including the bypass valve.

The characteristics disclosed herein serve particularly to perform the method and a corresponding structure has the advantage already mentioned that in the event of leakage in a front wheel brake circuit, at least one rear wheel brake continues to be acted upon with unreduced pressure from the brake pressure provider. This compensates at least partially for losses in front wheel braking force and thereby increases driving safety.

The invention will be better understood and further objects and advantages thereof will become more apparent from the ensuing detailed description of preferred embodiments, taken in conjunction with the drawings.

DESCRIPTION OF THE PREFERRED EMBODIMENTS

Figure 1:
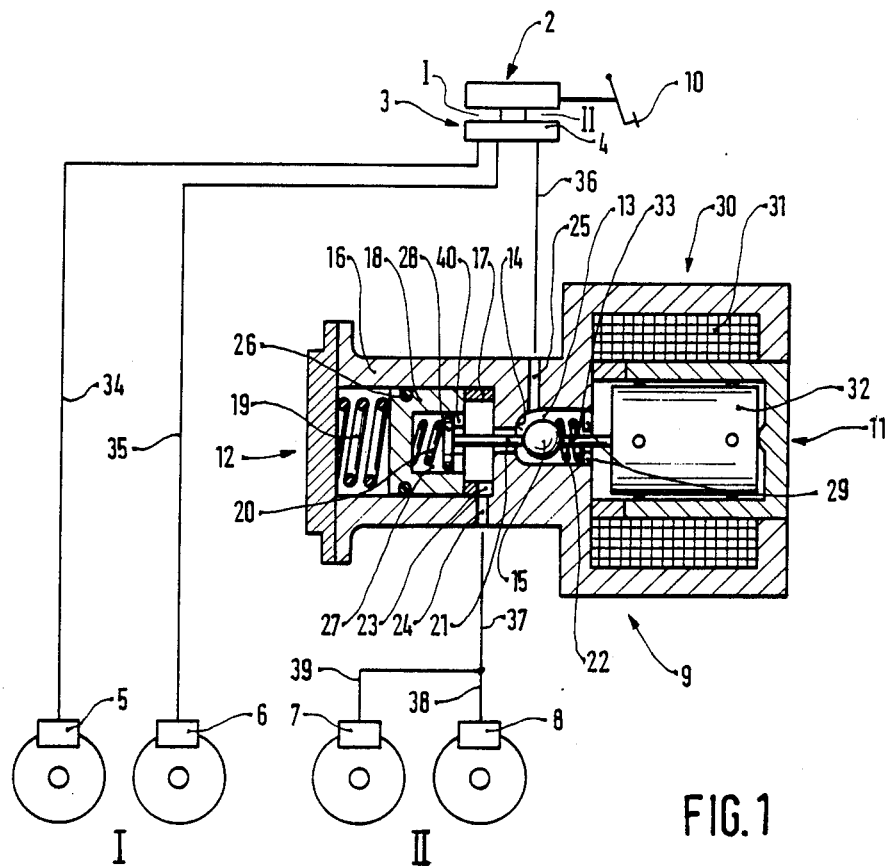
FIG. 1 shows a first exemplary embodiment of the vehicle brake system according to the invention, having the valve combination.

The first exemplary embodiment of a vehicle brake system shown in FIG. 1 illustrates a device for developing brake pressure in the form of a known footoperated brake booster 2, an anti-skid apparatus 3 such as shown in U.S. Pat. No. 4,484,784 and in U.S. Pat. application Ser. No. 675,043 filed Nov. 23, 1984 having a valve block 4, front wheel brakes 5, 6, rear wheel brakes 7, 8 and a valve combination 9 which functions in cooperation with the rear brakes.

The brake booster 2 corresponds by way of example to the type described in U.S. Pat. application Ser. No. 675,043 filed Nov. 23, 1984. It is controlled by means of a pedal 10. The valve block 4 contains anti-skid valves, not shown, the operation of which is also described in U.S. Pat. application Ser. No. 675,043 filed Nov. 23, 1984. The brakes 5, 6, 7, 8 can also be taken from the prior art and are therefore not described in detail herein.

The valve combination 9 includes a brake pressure maintenance valve 11 and a brake pressure regulating valve 12. The valve combination 9 has a valve chamber 13, located adjacent a valve seat 14; a movable valve element 15; an adjusting cylinder 16; an end closure 16a; an axial stop 17 in cylinder 16; an adjusting piston 18, and a pressure limiting spring 19 in cylinder 16; an opening spring 20; an opening tappet 21; and a closing spring 22. The adjusting cylinder 16 merges with the valve seat 14 in the projection of the longitudinal axis of the valve chamber 13. The axial stop 17, which is embodied in the form of a ring, is pressed into the adjusting cylinder 16 adjacent the valve seat 14. A radially oriented aperture 23 is machined into the axial stop. In alignment with this recess 23, the adjusting cylinder 16 has a rear wheel brake line connection 24. Near the valve seat 14, the valve chamber 13 has a brake fluid pressure line connection 25. The brake booster 2 serves as a brake fluid pressure applicator and is connected with the brake fluid pressure line connection 25. The adjusting piston 18 is displaceably built into the adjusting cylinder 16 next to the axial stop 17, and it is sealed off with respect to the inner wall of the adjusting cylinder 16 by means of an O-ring seal 26. The pressure limiting spring 19 is oriented between the end closure and the adjusting piston 18 with the piston located between the spring 19 and the axial stop 17. The adjusting piston 18 has a coaxially aligned spring receiving chamber 27, which is open toward the valve seat 14 and which receives opening spring 20. The opening tappet 21 carries a spring plate 28, which is displaceable inside the spring receiving chamber 27 counter to the force of the opening spring 20 and which is prevented from displacement out of chamber 27 by protrusions 40. Thus, beginning at the adjusting piston 18, the opening tappet 21 extends as far as the interior of the valve chamber 13. The closing spring 22 is supported inside the valve chamber 13 by means of protrusions 29 in such a manner that it urges the movable valve element 15, which is embodied for instance in the form of a ball, in the direction toward the valve seat 14.

The brake pressure maintenance valve 11 shares the valve chamber 13, the valve seat 14 and the valve element 15 in common with the brake pressure regulating valve 12 and also has an electromagnet 30 having a magnetic coil 31 and an armature 32. The armature 32 is aligned coaxially with the adjusting cylinder 16 and has a closing tappet 33, which is oriented in the direction of the valve seat 14 and rests against the valve element 15.

The vehicle brake system functions as follows:

When the pedal 10 is actuated, the brake booster generates braking pressure, which travels through the valve block 4 and lines 34, 35 to the front wheel brakes 5 and 6 and via a line 36 to the brake fluid pressure line connection 25 of the valve combination 9. If the fluid pressure generated by the brake booster 2 by means of the actuation of the pedal 10 is lower than a preselected pressure threshold, then the valve element 15 remains in the open position shown in FIG. 1, in which it is spaced from the valve seat 14, thereby opening the valve, for the low pressure is incapable of acting upon the adjusting piston 18 so forcefully that the adjusting piston 18 is displaced away from its axial stop 17 counter to the action of the pressure limiting spring 19. As a result, the pressure limiting spring 19 compresses the closing spring 22, via the adjusting piston 18, the opening spring 20 and the opening tappet 21; thus the valve seat 14 remains opened. The open valve seat 14 causes the valve chamber 13 to communicate with the adjusting cylinder 16 and the rear wheel brake via line 37 connected to connection 24. As a result, the braking pressure prevailing in the line 36 is carried on to the rear wheel brake connection 24 and from there to the rear wheel brakes 7 and 8, via lines 37, 38 and 39. Accordingly, in the front wheel brakes 5 and 6 and in the rear wheel brakes 7 and 8 braking pressures rise in accordance with how they are generated by the brake booster 2. For instance, if main cylinders built into the brake booster 2 have the same diameter for both the front wheel brakes and the rear wheel brakes, then the braking pressures in the front wheel brakes and in the rear wheel brakes rise to the same pressure levels.

Figure 2:
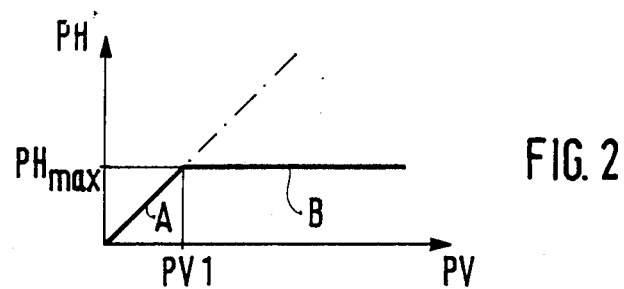
FIG. 2 is a diagram characterizing a rear wheel brake pressure limitation for the first exemplary embodiment.

If the actuating force upon the pedal 10 is increased, then the pressure exerted on the adjusting piston 18 increases as well. Finally, the pressure threshold mentioned above in cylinder 16 will be exceeded, causing the force of the pressure limiting spring 19 to be overcome. As a result, the adjusting piston 18 moves away from the axial stop 17 and thereby, via coupler protrusions 40, moves the spring plate 28 and the opening tappet 21 connected to the spring plate 28 away as well. Consequently, the closing spring 22 moves the valve element 15 against the valve seat 14, and no further pressure medium flows to the rear wheel brakes 7 and 8; as a result, no further pressure increase takes place in these rear wheel brakes. Meanwhile, by means of a still more forceful actuation of the pedal 10, the braking pressure in the front wheel brakes 5 and 6 can rise still further. This is shown in the form of a graph in FIG. 2, in which PV stands for the braking pressures in the front wheel brakes 5, 6 or at the brake fluid pressure line connection 25, and PH stands for brake pressures in the rear wheel brakes 7 and 8. A straight line $\underline{A}$ originating at coordinate point 0 and rising from there indicates that when the pedal 10 is actuated, the pressures PV and PH initially rise. Once the brake pressure PV attains the abovementioned pressure threshold PVI of the brake pressure regulating valve 12, any further rise of the braking pressure PH is prevented, as represented by the horizontally extending line $\underline{B}$ in the diagram. If the actuation force at the pedal 10 is lessened, then the front wheel brake pressure PV decreases, and when it passes below the pressure threshold PV1, the pressure limiting spring 19 presses the movable valve element 15 away from the valve seat 14, via the adjusting piston 18, the opening spring 20 and the opening tappet 21. As a result, the valve combination 9 is opened, and if the front wheel brake pressure PV is reduced further by means of the pedal 10, then the rear wheel brake pressure PH drops as well, along the sloping straight line $\underline{A}$.

If the electromagnet 30 is switched on, then the armature 32 presses the valve element 15, via the tappet 33, against the opening tappet 31 and thereby overcomes the force of the opening spring 20 which permits valve element 15 to move toward cylinder 16, so that the valve element 15 rests tightly against the valve seat 14. The electromagnet 30 is embodied strong enough, for example, that the valve element 15 remains at the valve seat 14 as long as a predetermined pressure drop between the rear wheel brake connection 24 and the brake fluid pressure line connection 25 is not exceeded. As a result, the valve combination 9 is capable of keeping brake pressure in the rear wheel brakes 7, 8 at the same level, while a pressure in the line 36 is reduced. The latter may happen, for instance, as a result of triggering the valve block 4. The valve block 4 is triggered if for instance one of the front wheel brakes 5, 6 brakes a wheel associated with it so severely that there is a danger of skidding. To overcome the danger of skidding, the brake pressure must in fact be reduced. If the brake booster 2 and the valve block 4 have typical characteristics as described in German patent application P 34 09 290.0, which is the same as U.S. Pat. application Ser. No. 675,043 filed Nov. 23, 1984 now U.S. Pat. No. 4,624,108, this brings about the above-mentioned reduction of the pressure in the line 36. As long as the wheels braked by the rear wheel brakes 7, 8 are not subject to a danger of skidding, it is disadvantageous to reduce the brake pressure in these brakes. This undesirable pressure reduction is prevented by switching on the electromagnet 30 as described.

It should also be noted that instead of the embodiment of the vehicle brake system as shown in FIG. 1, each rear wheel brake 7, 8 may have its own valve combination 9. The result is the known advantage that each rear wheel brake then contributes, independently of each other, to a maximum possible braking deceleration in the most favorable manner.

Figure 3:
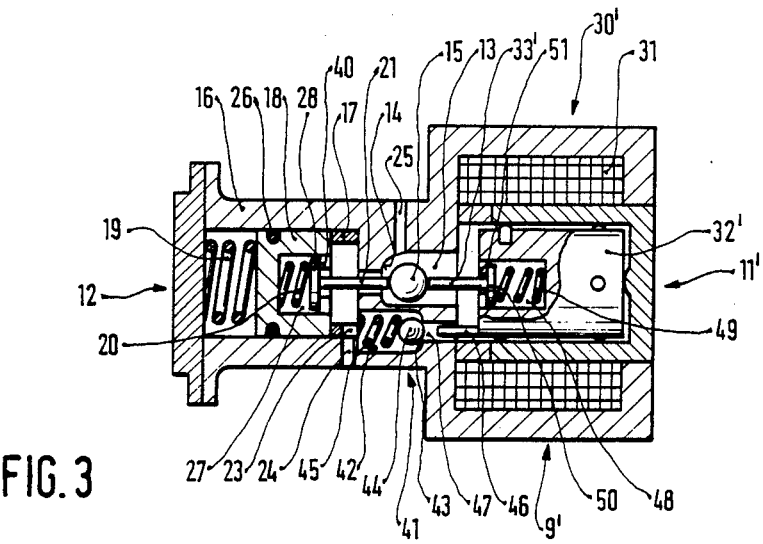
FIG. 3 shows a second exemplary embodiment of the invention.

The second exemplary embodiment shown in FIG. 3 differs from the first in that its valve combination 9' additionally has a controllable bypass valve 41. This valve has a valve chamber 42, a valve seat 43, a movable valve element 44 which may for instance be in the form of a ball, and a closing spring 45. The valve seat 43 communicates via a conduit 47 which surrounds opening tappet 46 with the valve chamber 13. The valve seat 43 adjoins the conduit 47. Adjoining valve seat 43 in turn is the valve chamber 42 of the bypass valve 41, which opens into the recess 23 of the axial stop 17. The closing spring 45 is inserted into the valve chamber 42 between the axial stop 17 and the valve element 44 and is strong enough that the valve element 44 also remains on its valve seat 43 if, with the valve seat 14 properly sealed, a predetermined pressure drop is not exceeded between the brake fluid pressure line connection 25 and the rear wheel brake connection 24. An opening tappet 46 is rigidly secured to an armature 32' and oriented toward the movable valve element 44. This armature 32' differs from the armature 32 of the first exemplary embodiment in that it has a closing spring receiving chamber 48, which is disposed concentrically and opens in the direction of the valve element 15. The closing spring receiving chamber 48 receives a closing spring 49 and a spring plate 50. The spring plate 50 is joined to a closing tappet 33' oriented toward the valve element 15. Protrusions 51 disposed on the armature 32' assure that the spring plate 50 and the closing spring 49 remain within the closing spring receiving chamber 48. The part of the valve combination 9' that embodies the magnetically controllable brake pressure maintenance valve 11' is by reason of its structure a so-called 3-position valve, which beginning at its outset position, shown, is selectively controllable into a second and a third position by means of two currents of different intensities, as a result of an actuation of the magnet. In the first actuation at a lesser current, the armature 32' moves in the direction of the valve seat 14 and by means of the closing spring 49 presses the valve element 15 against the valve seat 14. The opening tappet 46 is dimensioned such that it reaches the valve element 44 of the bypass valve 41 no earlier than when the valve element 15 is resting on the valve seat 14. As already mentioned, the closing spring 45 of the bypass valve 41 is embodied as a strong spring and therefore, at the first actuation of the magnetic coil 31 with a low current, keeps the valve body 44 against the valve seat 43 despite the opening tappet 46 resting against it. An actuation of the magnetic coil 31 with a second, stronger current causes the armature 32' via the opening tappet 46 to overcome the force of the closing spring 45 of the bypass valve 41 as well. As a result, the valve element 44 is pressed away from the valve seat 43, and the connections 24 and 25 communicate with one another by means of the valve chamber 13 and the valve seat 43. In this switching position of the valve combination 9', pressure from the brake booster 2 is delivered without being reduced, that is, at full strength, to the rear wheel brakes 7, 8. The advantage is as described in the background section above, that in the event that one of the front wheel brakes should skid and the braking pressure should be reduced there, a braking pressure which is at the same level as that furnished by the brake booster 2 will still be furnished to the rear wheel brakes 7, 8. In the desired manner, this increases the rear wheel braking forces. By actuating the pedal 10 more strongly, the pressure in the rear wheel brakes can be increased still further. The antiskid apparatus 3 assures that if the pedal 10 is actuated too hard, the maximum possible friction between the rear wheels and the road surface will be exploited.

This second valve combination 9', like the first valve combination 9, can also be disposed such that each one of the rear wheel brakes has its own pressure line.

The valve combinations 9, 9' can also be used in brake systems the brake boosters and anti-skid concepts differ from those of U.S. Pat. application Ser. Number 675,043 filed Nov. 23, 1984, such as in U.S. Pat. Nos. 4,478,461 and 4,484,784.

Figure 4:
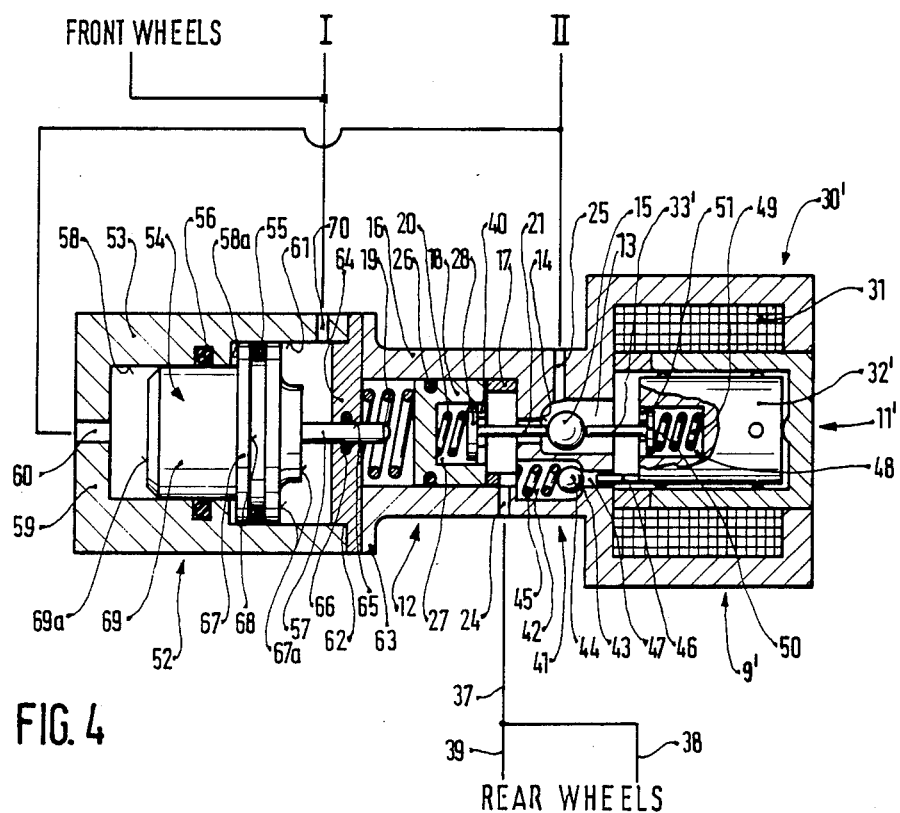
FIG. 4 shows a further development of the invention.

The exemplary embodiment shown in FIG. 4 differs from the above-described exemplary embodiments in having a hydraulic control device 52, which is mounted on the brake pressure regulating valve 12. The same reference numerals as those above are used for parts which remain the same and have the same function. The control device 52 has a stepped cylinder 53, a differential piston 54, two sealing rings 55, 56 and a tappet 57.

The stepped cylinder 53 has a first bore 58, the diameter of which is for instance larger than that of the adjusting piston 18, and an end wall 59 having a fluid pressure connection bore 60. The first bore 58 is adjoined in a coaxial orientation by a second bore 61, the diameter of which is larger than that of the first bore 58. A centering extension 62 which is formed on the adjusting cylinder 16 plunges into the second bore 61. Adjoining the centering extension 62, the adjusting cylinder 16 has an annular flange 63. There is also an end wall 64 disposed on the adjusting cylinder 16. The centering extension 62 is aligned coaxially with a bore 65 penetrating the end wall 64. The tappet 57 that is joined to the differential piston 54 extends through the bore 65, is surrounded by a sealing ring 66 inserted into the end wall 64 and is oriented toward the adjusting piston 18. Inside the bore 61, the differential piston 54 has a piston section 67 having a circumferential groove 68, into which the sealing ring 55 is placed. The piston section 67 is adjoined by a piston section 69, which plunges into the smaller bore 58 and is surrounded there by the sealing ring 56. The piston section 69 has an impingement surface 69a, which is determined by the diameter of the piston section 69. The impingement surface 67a of the piston section 67 is larger than the impingement surface 69a. In addition to the centering extension 62, a connection bore 70 discharges into the bore 61. The connection bore 70 communicates with a brake circuit I, of which two front wheel brakes 5, 6, for instance, are a part, as shown in FIG. 1. The connection bore 60 communicates with a brake circuit II, to which the brake pressure regulating valve 12 and at least one rear wheel brake 7, 8 (see FIG. 1) belong. A brake fluid pressure means supplying the brake circuits I, II is embodied for mulitiple circuits, for instance as a brake booster 2 (see FIG. 1).

The third exemplary embodiment as shown in FIG. 4 operates as follows:

If the vehicle brake system is properly sealed and the brake booster is providing identical pressures to the brake circuits I and II, then during braking the action exerted upon the impingement surface 67a predominates over that of the impingement surface 69a. As a result, the differential piston 54 assumes a position in which the piston section 67 rests at a transition 58a which is located between the bore 61 and the bore 58.

The tappet 57 is now spaced apart from the adjusting piston 18 such that the adjusting piston 18 can compress the pressure limiting spring 19. If there is insufficient braking pressure as a result of a leak in the brake circuit I, then braking pressure introduced into the bore 58 from the brake circuit II displaces the differential piston 54 and the tappet 57 against the adjusting piston 18, because as already noted the diameter of the piston section 69 is larger than that of the adjusting piston 18, and presses the adjusting piston 18, if it is spaced apart form the axial stop 17, reliably back toward the axial stop 17 into its outset position, shown. As a result, as already described, the valve element 15 is raised away from the valve seat 14 via the opening tappet 21. If there is no pressure in the brake circuit I, or if the pressure there is dropping impermissively, the brake pressure regulating valve 12 thus remains open or is opened, so that braking pressure introduced into the brake pressure regulating valve 12 is effective, without being reduced, in the at least one rear wheel brake via the lines 37, 38, 39. As a result, front wheel braking force that has been lost is at least partially replaced with increased rear wheel braking force.

The disposition of the control device 52 is not limited to the brake circuit arrangement shown in FIG. 4. The control device 52 can also be combined with the exemplary embodiment shown in FIG. 1.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A vehicle brake system comprising a brake fluid pressure means for applying a brake pressure in said brake system, front wheel brakes, rear wheel brakes, and an antiskid apparatus between said brake fluid pressure means which controls fluid flow from master cylinder to said rear wheel brakes, a brake pressure regulating valve and one brake pressure maintenance valve disposed between said brake fluid pressure means and the rear wheel brakes, said brake pressure regulating valve and said brake pressure maintenance valve are united into a valve combination and have a hydraulically self-controlling rear wheel brake pressure limiter, a first valve seat and a first movable valve element, said first movable valve element is actuatable on one end by an adjusting piston and on the other end by an electromagnet of said brake pressure maintenance valve.

2. A vehicle brake system as defined by claim 1, characterized in that said first movable valve element is located inside a first valve chamber of said valve combination which includes a first valve seat and a brake fluid pressure means connection in said valve combination which connects with said brake fluid pressure means, said adjusting piston is in longitudinal axial alignment with said first valve chamber, in an adjusting cylinder which includes an axial stop and a rear wheel brake connection disposed on the axial stop, and connected with said rear wheel brakes, a pressure limiting spring disposed in said adjusting cylinder such that said limiting spring urges said adjusting piston in a direction of said first valve seat toward said axial stop, an opening spring disposed between said adjusting piston and said first valve element, and said electromagnet is oriented toward a closing tappet, which tappet points in a direction of said adjusting cylinder and is thereby oriented in turn toward said first valve element.

3. A vehicle brake system as defined by claim 2, in which said bypass valve includes a bypass valve chamber, which is oriented parallel to said first bypass valve chamber of the valve combination, said bypass valve chamber communicates with the rear wheel brake connection and inlcudes therein a first closing spring, a second movable valve element and terminates at a second valve seat which communicates with said brake fluid pressure means connection, and said electromagnet which includes an armature that engages an opening tappet, which is oriented toward said second movable valve element of the bypass valve, and also, via a second closing spring, engages the closing tappet of the brake pressure maintenance valve, said first closing spring is disposed in said bypass valve chamber of said bypass valve and is substantially stronger than said second closing spring which engages the closing tappet, and that said electromagnet, in a first excitation stage, is excitable in such a manner that, by means of said armature via the second closing spring and the closing tappet, said electromagnet presses said first valve element against said first valve seat, whereupon the opening tappet associated with the bypass valve comes to rest on the second valve element of said bypass valve, and said electromagnet, in a second excitation stage, is excitable so that said armature raises said second valve element of the bypass valve away from the second valve seat, in order to open said bypass valve.

4. A vehicle brake system as defined by claim 3, in which the brake fluid pressure means includes outlets that connects to at least two brake circuits (I, II), and a hydraulic control device connected to said outlets of the brake fluid pressure means whereby if a brake circuit (I) including at least one front wheel brake fails said brake pressure regulating valve controls one other brake circuit (II) in such a manner that no brake pressure limitation takes place.

5. A vehicle brake system as defined by claim 2, in which the brake fluid pressure means includes outlets that connects to at least two brake circuits (I, II), and a hydraulic control device connected to said outlets of the brake fluid pressure means whereby if a brake circuit (I) including at least one front wheel brake fails said brake pressure regulating valve controls one other brake circuit (II) in such a manner that no brake pressure limitation takes place.

* * * * *